United States Patent [19]
Thebert

[11] 3,769,790
[45] Nov. 6, 1973

[54] GAS TURBINE LUBRICATION
[75] Inventor: Glenn W. Thebert, Carmel, Ind.
[73] Assignee: General Motors Corporation, Detroit, Mich.
[22] Filed: Mar. 20, 1972
[21] Appl. No.: 235,966

[52] U.S. Cl................ 60/39.08, 60/39.14, 184/6.11
[51] Int. Cl. ............................................. F02c 7/26
[58] Field of Search.................. 60/39.08, 39.14; 184/6.11, 6.3

[56] References Cited
UNITED STATES PATENTS
| | | | |
|---|---|---|---|
| 3,451,214 | 6/1969 | Bradley | 60/39.14 |
| 3,691,759 | 9/1972 | Scheerer | 60/39.14 |
| 3,626,693 | 12/1971 | Guillot | 60/39.08 |
| 3,486,582 | 12/1969 | Carter et al. | 60/39.08 |
| 2,671,860 | 3/1954 | Bexins | 60/39.08 |

FOREIGN PATENTS OR APPLICATIONS
702,551  1/1965  Canada.............................. 184/6.11

Primary Examiner—Carlton R. Croyle
Assistant Examiner—Warren Olsen
Attorney—Paul Fitzpatrick et al.

[57] ABSTRACT

A gas turbine engine includes an electric starter and an engine-driven pump for supplying lubricating and cooling oil to the engine, including supplying it to bearings which are located in a relatively enclosed and hot part of the engine. The pump also supplies oil to a power transfer clutch included in the engine. The oil pump is disabled while the engine is being cranked by the starter and also for a time after fuel is cut off to shut down the engine. The supply of lubricating oil is interrupted by a dump valve connected to the outlet of the engine-driven lubricating oil pump.

3 Claims, 1 Drawing Figure

Patented Nov. 6, 1973 3,769,790
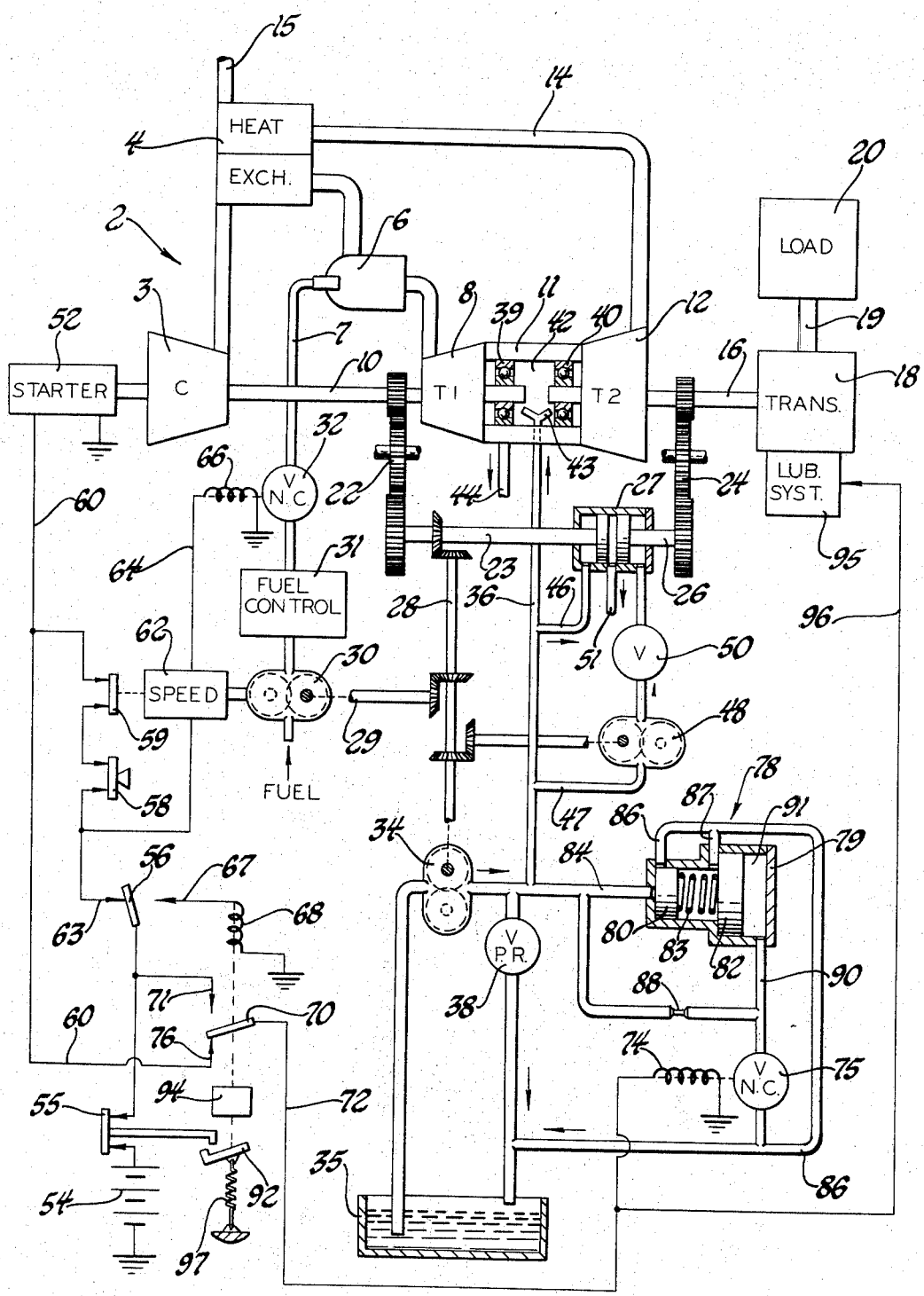

GAS TURBINE LUBRICATION

My invention relates to gas turbine engines and particularly to an improvement in the lubrication system of such an engine. In accordance with my invention the supply of lubricating oil to the engine is interrupted during cranking of the engine, to reduce the power required by the engine starter, and is interrupted during coast-down of the engine after fuel is shut off. The interruption of lubrication oil supply after shutdown of the engine avoids accumulation of oil in hot areas of the engine where it may be unduly heated, leading to decomposition of the oil and deposition of undersired residues.

In general, every gas turbine engine requires some means to crank the engine, which may be called a starter or cranking means. The starter must bring the rotating parts of the engine, or the gas generator of the engine, up to a speed at which the engine can operate in a self-sustaining mode before the starter can be deenergized. Since main shaft bearings and other bearings of gas turbine engines are often located in very hot environments, it is customary to supply rather large quantities of lubricating oil to such bearings, the excess of oil beyond what is necessary for lubrication being intended to cool the bearings by carrying away heat.

Normally, the oil is pumped by a positive-displacement pump operated by the gas generator or core engine of the gas turbine engine, and thus is operated during cranking of the engine. Particularly if an engine has been standing idle in a cold environment, considerable energy is required to operate the oil pump until the oil has been warmed. However, during the initial starting cycle of the engine, the need for bearing cooling does not exist and the bearings may be sufficiently lubricated by residual oil without supply of oil under pressure to them.

In some engines, main shaft bearings are located between two turbines and thus in an area in which high temperatures occur by soak-back of heat from the hot parts of the turbines after the engine is shut down. Bearings in such a location, where they are more or less enclosed, may have the oil removed by gravity flow, by gas pressure leaking from the compressor of the engine through shaft seals, or by a scavenge oil pump. Whatever the means adopted for removing the oil after it has been jetted onto the bearings, there may be oil left in the enclosure with the bearings after the engine is shut down. Due to the soak-back of heat from the turbines, this oil may tend to carbonize and leave undesirable residues. By shutting off the supply of oil at the same time that the supply of fuel is terminated to shut down the engine, the scavenging operation may proceed, by whatever means is employed, while the engine is coasting down and, due to the interruption of supply of oil, there is greater assurance of complete removal of unnecessary oil from the area in question.

Therefore, in its preferred embodiment my invention involves means to shut off the flow of lubricating oil to the engine, both during cranking and during coast-down after the engine has been turned off. Preferably, this is accomplished by a valve which may be energized to dump the lubricating oil delivered by the pump driven by the engine.

The principal objects of my invention are to facilitate the starting of gas turbine engines, to reduce the power drain attendant upon starting such engines, to promote thorough scavenging of the oil from the engine upon shutdown of the engine, and to minimize decomposition of the oil and attendant sedimentation within the engine.

The nature of my invention and its advantages will be more clearly apparent to those skilled in the art from the succeeding detailed description of the preferred embodiment of the invention and the accompanying drawing.

The FIGURE is a schematic diagram of a gas turbine engine of the gas-coupled type incorporating a starting and lubricating system embodying my invention.

Before entering into a description of the system according to the invention, it may be desirable to mention certain items of background. The invention may be incorporated in any gas turbine engine, but is specifically intended for a gas-coupled engine of the general nature of those illustrated in Collman et al. U.S. Pat. No. 3,267,674 issued Aug. 23, 1966 and Bell U.S. Pat. No. 3,490,746 issued Jan. 20, 1970. Those engines include a power transfer mechanism which is the subject of Flanigan et al. U.S. Pat. No. 3,237,404 issued Mar. 1, 1966. When the engine includes such a power transfer mechanism, the lubricating oil pump supplies oil for cooling the power transfer clutch and indirectly to a servo cylinder for engagement of the clutch. These functions add to the output requirement and power demand of the lubricating oil pump.

Details of lubricating systems or structures are not material to my invention, since various systems may incorporate the invention. By way of example, Gerdan et al. U.S. Pat. No. 2,875,579 issued Mar. 3, 1958 illustrates a shaft bearing lubrication system for a gas turbine engine.

The drawing illustrates an engine 2 including a compressor 3 which delivers compressed air through one pass of a heat exchanger 4 to a combustion apparatus 6. Fuel delivered to the combustion apparatus through a line 7 is burned, and the resulting combustion products are supplied to a first or gas generator turbine 8. This turbine drives the compressor 3 through a shaft 10. The combustion products exhausted from the first turbine flow through an annular duct 11 into the second or power output turbine 12. The exhaust from this turbine flows through ducting 14 and the other pass of the heat exchanger to an exhaust 15.

The power turbine 12 drives an output shaft 16 which is coupled through a transmission 18 and shaft 19 to a load 20. The transmission may be a reduction gear arrangement, a clutch, a manually shiftable transmission, an automatic transmission, or any suitable desired combination of such elements. The load 20 may be, for example, the driving wheels of a vehicle, an electric generator, or any other device which the gas turbine engine powers. With some types of loads, the transmission 18 might be omitted. As a practical matter, it may be closely integrated structurally with the engine.

The engine illustrated includes the power transfer of the Flanigan et al patent referred to above. Gearing 22 couples the gas generator shaft 10 to a shaft 23 and gearing 24 couples the power output shaft 16 to a shaft 26 coaxial with shaft 23. These two shafts may be coupled for transmission of torque between the shafts 10 and 16 by a variable torque coupling such as a friction clutch 27 called a power transfer clutch.

An accessory drive shaft 28 driven by turbine 8 through gearing 22 and shaft 23 provides power to various engine accessories. One of these accessories is a fuel pump 30 driven through shaft 29 which supplies fuel through an engine fuel control or power control 31 and a normally closed shutdown valve 32 to the fuel line 7 leading to the combustion apparatus. Another accessory driven by shaft 28 is an engine lubricating oil pump 34 which takes oil from a sump 35 and delivers it into a pressure lubricating oil line 36. A pressure relief valve 38 may be provided to control the pressure of the pump discharge.

The gas generator turbine shaft 10 is supported by a bearing 39 and the power turbine shaft 16 by a bearing 40, these being located in a space 42 disposed axially between the two turbines and within the annular duct 11. These bearings are lubricated by oil supplied through line 36 to oil jets 43 directed at the bearings. Scavenge oil is returned from bearings 39 and 40 through a line 44 which leads to the sump 35. This is a schematic illustration of the bearing arrangement and lubrication arrangement of the Bell patent referred to above.

A branch 46 from line 36 conducts cooling oil from this line to the power transfer clutch 27. Another branch line 47 conducts lubricating oil to a high pressure pump 48 driven off shaft 28 and thence through a power transfer control valve 50 to the clutch 27 where the oil serves to effect the engagement of the clutch as will be clear from the above-mentioned Flanigan et al. patent. Means to control valve 50 need not be described here. The cooling and actuating oil for the power transfer clutch 27 may be returned to the sump through a return oil line 51.

The engine includes a starter or cranking means 52 in the form of an electric motor suitably coupled to the shaft 10 for accelerating the compressor 3 and turbine 8 to start the engine. The starter may be energized from a source of current indicated by a battery 54, which might be the storage battery of a motor vehicle, through a master switch 55, a single-pole double-throw Run-Stop switch 56 (shown in the Run position), a manually operable normally open starter switch 58, a speed switch 59, and line 60. Switch 59 is closed at low operating speeds of the engine but is opened when the engine arrives at a self-sustaining speed by a speed responsive device 62 driven by the gas generator; as illustrated, by shaft 29. Thus, to start the engine, with the master switch 55 closed, the Run-Stop switch is moved to Run contact 63 and the starter switch 58 is closed. The speed switch 59 is closed because the engine is nonrotating, and the circuit is completed through the starter to ground to crank the gas generator. When switch 56 is turned to its Run position, it also energizes through a line 64 a solenoid 66 which opens the normally closed fuel shutoff valve 32.

The power plant as so far described may be considered as an example of preferred previously known engine or power plant structures to which my invention may be added. The invention as stated above lies in an arrangement to terminate the delivery of oil from pump 34 during starting and shut-down of the engine. The additional structures to serve these purposes will now be described.

In the Stop position of manually operable switch 56 it engages a contact 67 and thus energizes a relay coil 68. When the coil is energized, it closes a movable contact 70 on a front contact 71 energized from the battery 54 through the master switch 55. Therefore, when the switch 56 is in the Stop position and the master switch 55 is closed, the battery 54 is connected through a line 72 to a solenoid 74 which acts to open a normally closed valve 75 effective when open to disable the oil supply system, as will be explained. When the switch 56 is in the Run position energizing contact 63, and switches 58 and 59 are closed to energize the starter through line 60, the back contact 76 connected to line 60 is engaged by relay contact 70 so that line 72 is energized to open valve 75.

Valve 75 controls a dump valve 78 for the oil pump 34. Valves 75 and 78 may be combined in a commercial structure, but will be explained here on the basis of the schematic illustration. Valve 78 comprises a housing 79 defining a stepped cylinder or bore. A valve piston 80 is slidable in the smaller diameter bore and an abutment piston 82 is slidable in the larger diameter bore. When the abutment piston is in its normal position illustrated, it provides an abutment for a compression spring 83 which biases valve piston 80 to the position shown in which it prevents flow from a valve inlet line 84 branching from the oil pump outlet line 36 to a drain or return line 86. The back side of piston 80 and front side of piston 82 are relieved of pressure due to leakage through a drain connection 87. Abutment piston 82 is normally maintained in the position shown by oil pressure from line 84 supplied through a restriction or orifice 88 and line 90 to the chamber 91 on the back side of abutment piston 82. Since piston 82 is of greater area than piston 80, the piston 82 seats as shown to maintain the spring force on piston 80. Valve 75 is connected between chamber 91 and the drain line 86 so that, when this valve is open, the pressure in chamber 91 is relieved and the force on piston 80 acting through spring 83 drives piston 82 to the opposite end of its cylinder, relieving the force on spring 83 and allowing the oil pump 34 to discharge freely through valve 78 into the drain line 86. This disables or cuts off the supply of oil under pressure to the engine lubrication system and also to the power transfer clutch. When solenoid 74 is deenergized and valve 75 closes, the oil flowing through orifice 88 returns piston 82 to its normal position to seat piston 80 and maintain full pressure in the lubrication system. It will be appreciated that valve 78 may serve also as a pressure relief valve and thereby eliminate the need for the relief valve 38 shown.

The operation of the system upon starting and stopping the engine may be reviewed briefly. Before starting the engine, the master switch 55 is closed. When the Run-Stop switch 56 is moved to the Run position and the starter is energized by switches 58 and 59, line 60 is energized and relay 68 is deenergized so that line 72 is energized through relay contacts 76 and 70, thus opening valve 75 and diverting the discharge of pump 34 to the drain line 86. It will be understood that switch 58 may be a switch which latches closed or remains closed until released. In any event, when the starting cycle has reached a point at which the engine is self-sustaining, the starter and also valve 75 are deenergized by the speed switch 59. Normal lubrication oil flow thus begins.

To stop the engine, switch 56 is moved to its Stop position on contact 67, energizing relay 68 and thus energizing line 72 through contact 71 to again disable the oil supply system. This movement of switch 56 also deenergizes the fuel shutoff valve 32 terminating supply of fuel to the engine. The engine thus coasts down with the oil supply shut off, and the oil supply will remain shut off until the master switch 55 is opened to denergize the solenoid valve preferably after the engine has coasted to or nearly to a stop. It is desirable to provide an interlock between switches 56 and 55 such that master 55 will open automatically a given time after switch 56 is moved to the Stop position. This may be effected by a latch 92 engaged by relay coil 68 through a dashpot device 94 and opened after the dashpot delay by a spring 97. Thus master switch 55 holds valve 75 energized for a predetermined time and then opens all circuits, deenergizing relay 68.

The cessation of lubricating oil supply after the engine fuel has been turned off allows the scavenging means to dispose of any accumulations of oil in the engine without the additional burden caused by continued supply of lubricating oil. During the start and the coast-down of the engine additional supply of lubricating oil to serve the cooling and lubricating functions is not required.

As for lubrication of the transmission, it may be lubricated directly from the engine pump 34 or may have its own lubrication system. If it is desired to shut off a transmission lubrication system for any reason during starting or coast-down of the engine, this can be arranged. As indicated schematically in the Figure, the transmission has a lubrication system 95 which receives an input through a line 96 from the line 72 which energizes valve 75. The signal through line 96 may operate any suitable means to deactivate the transmission lubrication system. Ordinarily, with a gas-coupled engine in which the power output shaft is independent of the gas generator at starting, there is no need to deactivate a transmission oil pump, but not all engines are gas-coupled.

It should be apparent to those skilled in the art from the foregoing description that my invention is particularly suited to improve the starting characteristics and lubrication of gas turbine engines of various types.

The detailed description of the preferred embodiment of the invention for the purpose of explaining the principles thereof is not to be considered as limiting or restricting the invention, since many modifications may be made by the exercise of skill in the art.

I claim:

1. A gas turbine engine comprising, in combination, a compressor, a combustion apparatus, at least one turbine, means for supplying lubricating and cooling oil to the engine, means for cranking the engine, and means for supplying fuel to the combustion apparatus of the engine including means for shutting off the fuel to shut down the engine, in combination with means for disabling the means for supplying oil during cranking of the engine and means operating concurrently with the means for shutting off fuel effective to disable the oil supplying means during coastdown of the engine.

2. A gas turbine engine comprising, in combination, a compressor, a combustion apparatus, at least one turbine, shaft bearings disposed in a hot location in the engine, means for supplying lubricating and cooling oil to the engine including at least means for supplying the oil to the said bearings, means for cranking the engine, and means for supplying fuel to the combustion apparatus of the engine including means for shutting off the fuel to shut down the engine, in combination with means for disabling the means for supplying oil during cranking of the engine and means operating concurrently with the means for shutting off fuel effective to disable the oil supplying means during coastdown of the engine.

3. A gas turbine engine comprising, in combination, a compressor, a combustion apparatus, at least one turbine, shaft bearings disposed in a hot location in the engine, means for supplying lubricating and cooling oil to the engine including at least means for supplying the oil to the said bearings, means for cranking the engine, and means for supplying fuel to the combustion apparatus of the engine including means for shutting off the fuel to shut down the engine, in combination with means for disabling the means for supplying oil during cranking of the engine and means operating concurrently with the means for shutting off fuel effective to disable the oil supplying means during coastdown of the engine, the means for disabling the oil supplying means including a dump valve connected to the oil supplying means, electrical actuating means for the dump valve, means for energizing the actuating means while the cranking means is energized, and relay means for energizing the actuating means for a predetermined time when the fuel shutoff means is actuated.

* * * * *